Figure 1:
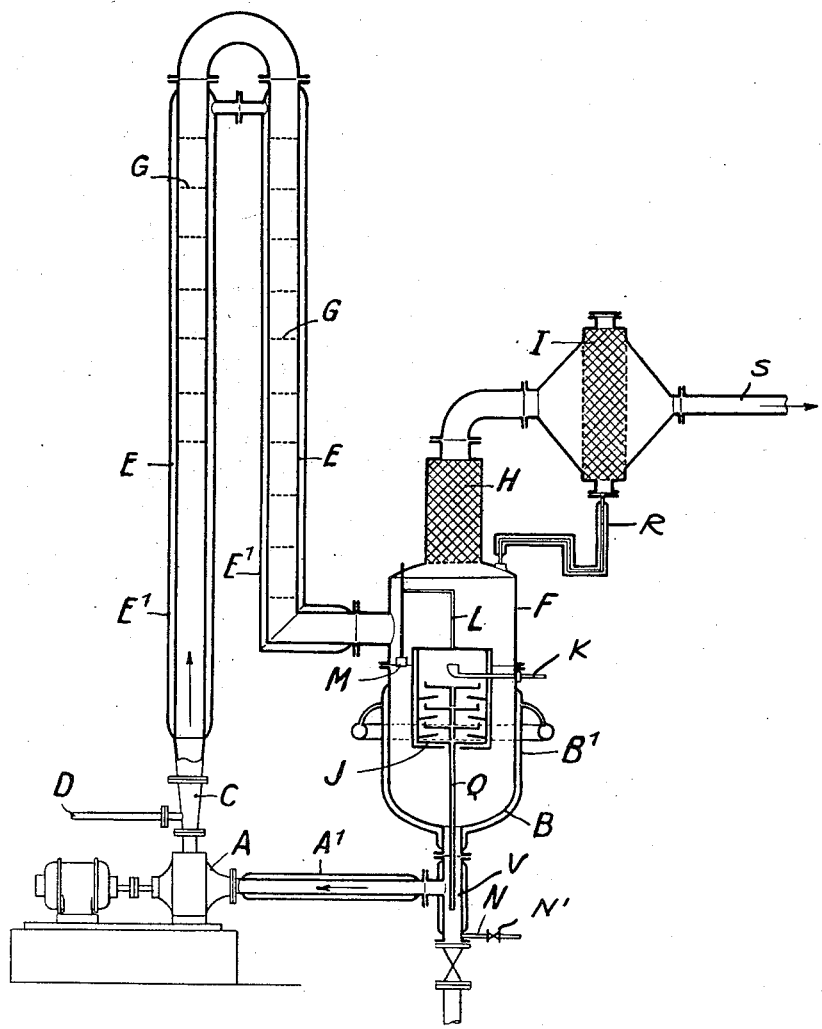

June 3, 1952 J. LIENHART 2,599,466
APPARATUS FOR CONTINUOUS CATALYSIS
Original Filed June 27, 1946 2 SHEETS—SHEET 1

INVENTOR
Jean Lienhart
By
Blair, Curtis + Hayward
ATTORNEYS

Patented June 3, 1952

2,599,466

UNITED STATES PATENT OFFICE 2,599,466

APPARATUS FOR CONTINUOUS CATALYSIS

Jean Lienhart, Paris, France, assignor to Compagnie Francaise De Raffinage, Paris, France, a French corporation Original application June 27, 1946, Serial No. 679,724. Divided and this application August 19, 1948, Serial No. 45,157. In France May 8, 1943

5 Claims. (Cl. 23—285)

The present invention relates to an improved apparatus for carrying out a continuous catalytic reaction in the liquid phase. The present apparatus has been found useful in the catalytic decarboxylation of rosin, and will be illustratively described in connection with this reaction although, as the description proceeds, it will be apparent that the invention is applicable to many other types of catalytic reactions as well. The present application is a division of my prior application Serial No. 679,724 filed June 27, 1946, now Patent No. 2,517,690, dated August 8, 1950.

The catalytic decarboxylation of rosin has hitherto been carried out in boilers or stills of a capacity that may be as much as several tons. Such boilers, which may or may not be provided with stirrers, contain the mass of rosin to be decarboxylated and the catalyst, if one is used. Various catalysts have been proposed, including, for example, phosphoric acid in proportions which may vary, according to the authority, from 1% to 50%.

I have discovered that the decarboxylation of rosin may be carried out with advantage by feeding melted rosin into a liquid mass which contains the catalyst in solution or suspension, and which is in a state of violent agitation. The liquid mass usually, but not necessarily, comprises the decarboxylated oil itself, a part of which is circulated in a closed circulating system from which a quantity of decarboxylated oil corresponding to the rosin supplied is continuously removed.

The catalyst, which gradually becomes adulterated with acid tars and thereby loses a part of its activity, is likewise continuously removed from the circulating system, regenerated in any appropriate manner, and continuously or periodically reintroduced into the system. In this way the activity of the catalyst may be kept at a good average level. Since the decarboxylated oil, on the one hand, and the catalyst and associated tars, on the other hand, form separate liquid phases, they may be effectively separated by decantation. Hence the reaction products, after gases and vapors have been separated therefrom, are subjected to continuous decantation in order to separate the oil from the acid tars formed, and both tars and oil may be continuously removed from the system.

Figure 2:
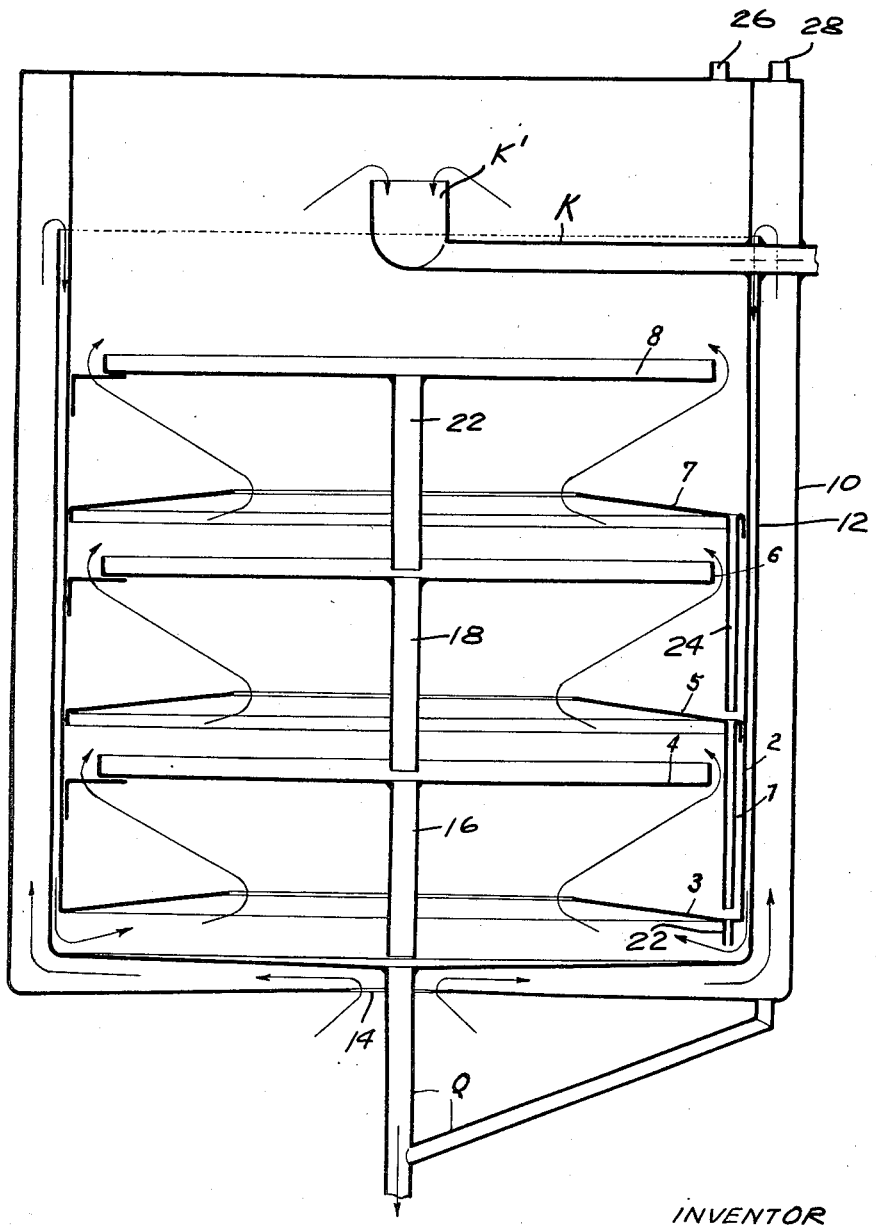

The objects and advantages of the present invention may best be understood and appreciated by reference to the accompanying drawings which show apparatus incorporating an illustrative embodiment of the present invention and wherein:

Figure 1 is a general diagrammatic view of the apparatus for carrying out a continuous catalytic reaction; and Figure 2 is a vertical, axial section through the decanter of Figure 1, showing somewhat diagrammatically the internal construction of the decanter.

Referring first to Figure 1, the apparatus there shown comprises a circulating system including a vertical U-shaped column E, a vapor separator tank B, a pipe A', a pump A, and injector C. As shown in the drawing, the column E discharges into the tank B, and liquid from the bottom of tank B flows through pipe A' to the pump A, whence it is pumped through injector C to the inlet of column E.

The rosin to be fed to the reaction mass is preferably melted and preheated to a temperature which may be as high as 250° C. The preheated rosin is conveyed to the apparatus through a tube D and is introduced into the suction end of an injector C at a suitable rate, say 1200 kg. per hour. The circulating reaction mass which constitutes the driving fluid of the injector C, comprises mainly decarboxylated oil containing the catalyst. The catalyst may, for example, be phosphoric acid and may be present in the reaction mass to the extent of about 2% by weight.

As previously described, the pump A withdraws a liquid mixture from the bottom of tank B through the pipe A' at a suitable rate, say 100 cubic meters per hour, and delivers it to the injector C. The incoming melted rosin from tube D is diffused into and thoroughly mixed with the liquid reaction mass which then passes into the column E. Within the column E are the baffles G which are so arranged as to keep the liquid mass passing therethrough in a continuous state of agitation. The desired agitation may be effected in various ways as, for example, by foraminous disks or conventional column packings.

In order to maintain the desired decarboxylation temperature in the column E, which temperature, when using the specific catalyst disclosed herein, is of the order of 250° C., the column is provided with an oil-circulation jacket E' through which hot oil can be circulated.

The column E discharges into the vapor separator tank B wherein liquid reaction products are separated from gases and vapors which comprise decarboxylation products, such as carbon dioxide, carbon monoxide, and hydrocarbons, and also water vapor and pinoline. The gases and vapors collect in the dome F of the tank B, and flow therefrom through a dephlegmator H and separator I, both of which are filled with a suitable packing such as Raschig rings. Entrained and condensed liquids from dephlegmator H flow directly back into tank B, whereas liquid separated in the separator I flows back to tank B through pipe R. The gases and vapors leave the apparatus through pipe S and flow into a condenser and a pinoline and acid water separator (not shown).

The tank B is provided with an oil circulation jacket B', by means of which a temperature of 250° C. is maintained therein and the reaction is completed within the tank.

Instead of using an injector such as the injector C, it is possible without departing from the invention to introduce the feed rosin ahead of the pump A in which case the desired agitation is effected inside the pump itself. However, the injector is preferably used owing to the fact that it produces very intimate mixing with a comparatively small expenditure of power.

Mounted within the separator tank B there is continuous decanter J described in more detail hereafter which serves to separate the decarboxylated oil from the catalyst and tars. The decanter J may have a volume of say 400 liters and makes it possible to remove, through pipe K, a decarboxylated oil that is practically free from catalyst. The catalyst and tars flow from decanter J downwardly through pipe Q to a T-shaped fitting V where they accumulate.

The mounting of decanter J within tank B offers several advantages. Thus the decanter acts as a core and reduces the effective volume of the separator, thereby facilitating heat exchange from the heating medium in the jacket B' to the liquid in tank B. Also, since the decanter is within tank B the decantation is effected in the hot state and at constant temperature.

The reference character L designates a pressure equalizing tube that equalizes the pressure between the top of the interior of decanter J and the interior of dome F of tank B. Also provided within tank B there is a float M which may be connected to suitable and well known apparatus (not shown) for regulating the removal of products from the circulating system.

The tars and the catalyst to be regenerated collect in the dead end of fitting V which thus comprises a collecting chamber or sump. Removal of collected liquid from the fitting V is effected through a relatively small tube N by manipulation of valve N'. The dead end fitting V obviates delicate adjustment of the flow rate of the removed tars since it enables more or less tar and catalyst to be removed from the system without the rate of removal being rigidly proportional to the output of the decanter.

Although any type of decanter is suitable for use in the present apparatus, the decanter shown in Figure 2 presents certain advantages in that it provides for decantation in a plurality of thin layers. Referring to Figure 2, the decanter there shown comprises an outer cylindrical shell or casing 10, an intermediate shell 12 and an inner shell 2. The intermediate shell 12 extends upwardly to a point somewhat below the top of the decanter, and the inner shell 2 extends downwardly from the top of the decanter to a point somewhat above the bottom of the decanter. The liquid mixture to be separated enters the bottom of shell 10 through a hole 14, flows upwardly between shells 10 and 12, then downwardly between shells 12 and 2 and into the central chamber of the decanter.

Supported on the inner wall 2, there are a series of annular baffles 3, 5 and 7 between and above which are mounted the trays 4, 6 and 8. As indicated by the arrows in Figure 2, the liquid flows through the hole in each annular baffle and around the edge of each tray. The annular baffles 3, 5 and 7 slope downwardly toward their peripheries to provide a space in which the liquid mixture can accumulate and separate, and the shallow trays 4, 6 and 8 likewise provide a quiescent area for separation of the two liquid phases. The trays 4, 6 and 8 are provided respectively with the central down pipes 16, 18 and 20 through which the heavier liquid phase may flow downwardly and out through the discharge pipe Q of the decanter. Similarly, the annular baffles 3, 5 and 7 are provided with the peripheral down pipes 22, 1 and 24 respectively, through which the heavier liquid phase may flow toward the bottom of the decanter and eventually into discharge pipe Q. The space between shells 10 and 12 also communicates, near the bottom periphery of the decanter, with a branch of discharge pipe Q to permit the heavier liquid phase to flow therefrom into the discharge pipe.

Near the top of the decanter there is a discharge pipe K that extends through the side walls of the decanter and is provided with an inlet K' confronting the top of the decanter. A pressure equalizing conection 26 in the top of the decanter communicates with the central chamber of the decanter and a second pressure equalizing connection 28 communicates with the space between shells 10 and 12.

As the liquid mixture flows upwardly through the decanter, separation is effected between the two liquid phases on the baffles 3, 5 and 7 and the trays 4, 6 and 8. The heavier liquid phase continuously flows downwardly through down pipes 16, 18 and 20 and 22, 1 and 24, whereas the lighter phase continues to rise through the decanter, and in separated condition flows out of the decanter through pipe K.

From the foregoing description it is apparent that the present invention provides an unusually effective apparatus for carrying out catalytic reactions in the liquid phase. The oil obtained by utilizing the present apparatus for the decarboxylation of rosin is of a fine color and requires less earth for refining or isomerizing than the oils obtained by utilizing other apparatus.

Although the present apparatus has been described with reference to the decarboxylation of rosin, it is manifestly applicable to other continuous liquid phase catalytic reactions. In general, the apparatus of the invention may be used in any case where the finished product and/or the exhausted catalyst is separable from the circulating mass by decantation, or by centrifugation.

Since many embodiments might be made of the present invention and since many changes might be made in the embodiment disclosed herein, it is to be understood that the foregoing description is to be interpreted as illustrative only and not in a limiting sense.

I claim:

1. A combined liquid decanter and gas separator adapted for use in separating gaseous and two-phase liquid materials which comprises a first outer substantially vertical closed vessel having an inlet aperture at the top and side thereof whereby a mixture of gaseous and two liquid phases may be conducted into the first vessel; an outlet aperture at the top of said vessel whereby disengaged gas may be conducted from said vessel; an outlet aperture at the bottom of the vessel whereby liquid may be discharged from said vessel; a second substantially vertical closed vessel within said first vessel; the top of said second vessel being below said inlet aperture; said second vessel having a plurality of side walls spaced alongside one another and thereby defining a path whereby entering liquid may flow first upwardly between the outermost side wall and that wall adjacent thereto and thence successively in generally reverse directions to the lower central portion of said second vessel; a substantially central inlet aperture in the bottom of said second vessel to permit entrance of liquid thereto; a plurality of vertically spaced trays and baffles within said second vessel to provide a sinuous path for ascending liquid and also defining quiescent zones therein; an outlet aperture in the upper portion of said second vessel for removing light separated liquid both from the first and second vessels and a plurality of conduits passing from uppermost to lowermost trays and baffles respectively for discharging into a central outlet conduit in the bottom of the second vessel whereby heavier settled liquid may be discharged from the second vessel to a zone outside the first vessel.

2. A combined liquid decanter and gas separator adapted for separating gaseous and two-phase liquid mixtures which comprises a first outer vessel which is substantially closed and vertically positioned; said first vessel having an inlet aperture at the upper side whereby said mixture may be introduced into the vessel; an inlet aperture at the top of said first vessel whereby disengaged gas may escape from said vessel; an outlet aperture at the bottom and approximately the center of the vessel whereby liquid may be discharged from said vessel; a second substantially vertical closed vessel within said first vessel; the top of said second vessel being below the inlet aperture of the first vessel; said second vessel having a substantially centrally positioned inlet aperture in the bottom thereof for the entrance of liquid to be separated; said second vessel having three adjacent side walls defining a path for said entering liquid whereby the entering liquid first flows upwardly between the outermost wall and the adjacent wall and thereupon flows downwardly to the central portion of the vessel between the middle wall and the innermost wall; a plurality of vertically spaced trays and baffles within said second vessel to provide a sinuous path for ascending liquid and also providing quiescent zones on each tray and above each baffle whereby the liquid phases may settle in said quiescent zones; an outlet aperture in the upper portion of said second vessel which extends through the side walls of said vessel and through the side wall of the first vessel for conducting light liquid material to a discharge zone; a plurality of conduits passing from tray to tray and from baffle to baffle to a central outlet conduit in the bottom of said second vessel whereby heavier liquid phases may be discharged to a zone outside the first vessel.

3. A combined liquid decanter and gas separator according to claim 2 wherein said second vessel contains at least two trays and at least two baffles.

4. A combined liquid decanter and gas separator according to claim 2 with the addition of a gas dephlegmator positioned over the gas outlet aperture of the first vessel.

5. A combined liquid decanter and gas separator according to claim 2 with the addition of a liquid level controller which maintains the level of liquid in the first vessel above the level of the uppermost discharge conduit of the second vessel.

JEAN LIENHART.

REFERENCES CITED

The following references are of record in the file of this patent:

UNITED STATES PATENTS

| Number | Name | Date |
|---|---|---|
| 1,934,309 | Hoover | Nov. 7, 1933 |
| 1,940,794 | Fisher | Dec. 26, 1933 |
| 2,283,209 | Hull et al. | May 19, 1942 |
| 2,325,516 | Holt et al. | July 27, 1943 |
| 2,332,527 | Pyzel | Oct. 26, 1943 |
| 2,374,511 | Upham | Apr. 24, 1945 |